United States Patent [19]
Ruehland
[11] Patent Number: 4,991,736
[45] Date of Patent: Feb. 12, 1991

[54] COLLECTION CONTAINER FOR REUSABLE MATERIAL

[76] Inventor: Lothar Ruehland, Grasgarten 34, 3340 Wendeburg, Fed. Rep. of Germany

[21] Appl. No.: 200,201

[22] Filed: May 31, 1988

Related U.S. Application Data

[63] Continuation of PCT EP87/00416 filed Jul. 30, 1987.

[30] Foreign Application Priority Data

Jul. 31, 1986 [DE] Fed. Rep. of Germany ....... 3625995
Apr. 22, 1987 [DE] Fed. Rep. of Germany ... 8705993[U]

[51] Int. Cl.[5] ......................... B65D 90/62; F16K 3/04
[52] U.S. Cl. .................................. 220/4.24; 220/334; 220/4.27; 220/969; 222/506; 222/510; 251/212
[58] Field of Search ...................... 220/1 T, 4 E, 334; 222/506, 508, 510; 251/212

[56] References Cited

U.S. PATENT DOCUMENTS 543,182 7/1895 Hunt .................................. 251/212
770,097 9/1904 McMahon .......................... 251/212
892,944 7/1908 Drawe ............................... 251/212
2,718,335 9/1955 Shippen ............................ 222/510
3,195,272 7/1965 Mosher et al. ..................... 220/4 E
4,514,129 4/1985 Legille et al. ...................... 222/506
4,558,799 12/1985 Hammond ......................... 220/1 T
4,815,696 3/1989 Lonardi ............................. 251/212
4,830,236 5/1989 Broll et al. ......................... 251/212
4,844,292 7/1989 Lonardi et al. ..................... 222/506

FOREIGN PATENT DOCUMENTS 929321 5/1982 U.S.S.R. ............................ 222/506

*Primary Examiner*—George L. Walton
*Attorney, Agent, or Firm*—Foley & Lardner, Schwartz, Jeffery, Schwaab, Mack, Blumenthal & Evans

[57] ABSTRACT

A collection container for reusable material with a closed upper structure, which has a bottom opening to a base and to which is pivoted a bottom which can be swung outwardly for emptying, the upper structure having at its top at least one insertion opening, can be very simply and economically made and has a high stability because the upper structure is formed two housing halves, facing each other in a vertical plane and connected to one another by a connecting profile which holds the housing halves together and extends around the upper structure in a vertical plane.

23 Claims, 16 Drawing Sheets

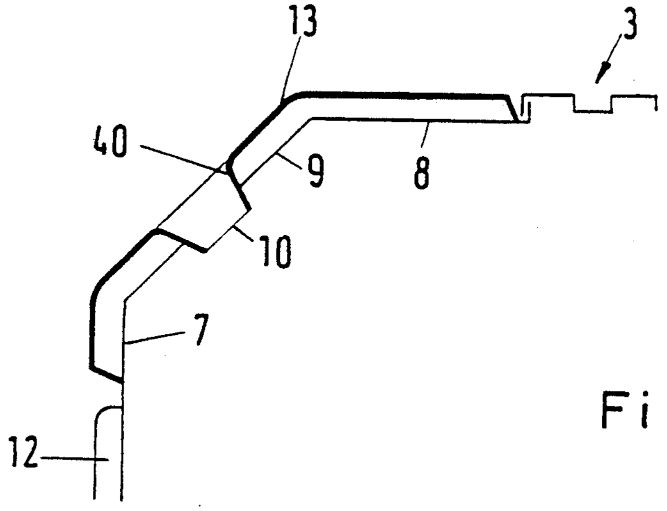
Fig.10
Fig.9
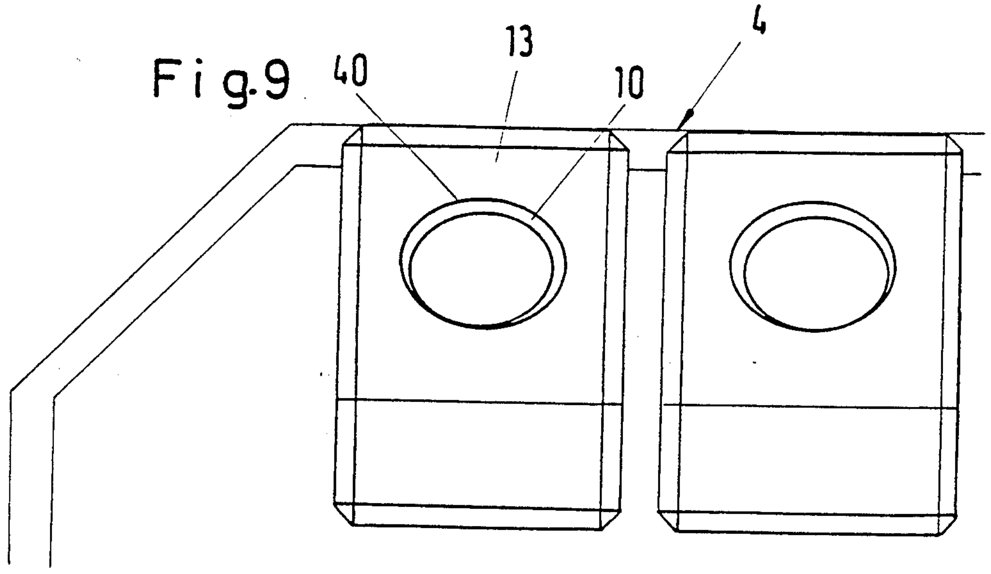

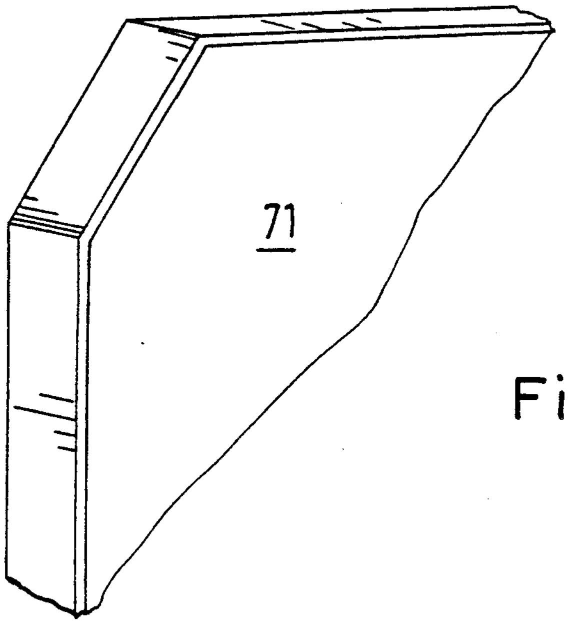
Fig. 22
Fig. 23
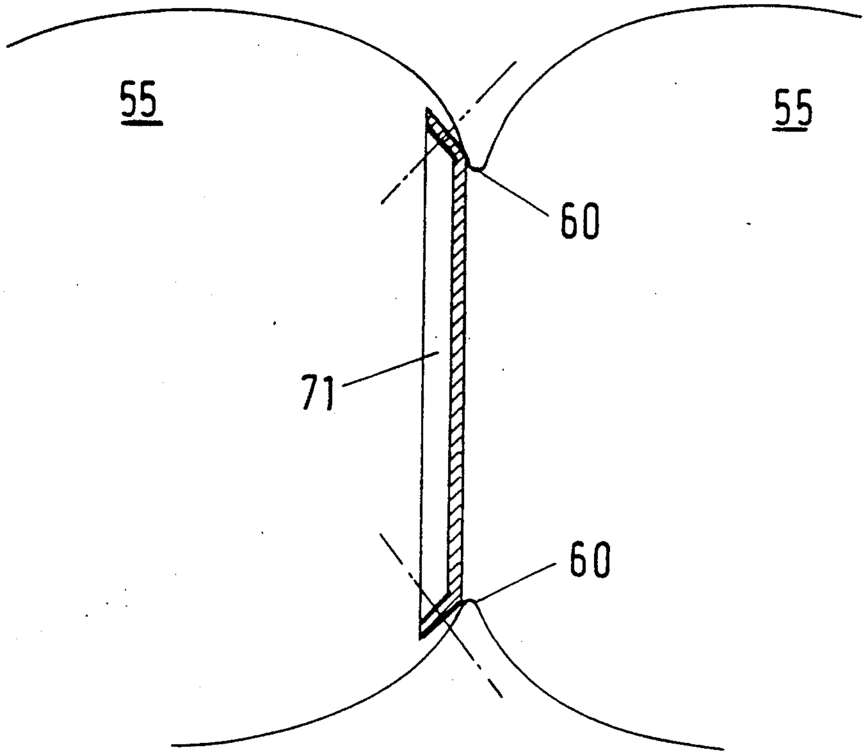

COLLECTION CONTAINER FOR REUSABLE MATERIAL

CROSS REFERENCE RELATED APPLICATION

Continuation of PCT EP87/00416 filed Jul. 30, 1987

The present invention relates to a collection container for reusable material, with an upper structure which has a bottom opening to a base and to which is pivoted a bottom which can be swung outwardly for emptying, and at least one filling opening at the top.

Prior art containers of this type are, for example, manufactured of glass fiber reinforced plastic material and have a one-piece upper structure, which for example may be formed in the shape of a dome. The upper side of the container is provided with a fitting, at which an actuating mechanism is secured for the bottom flaps forming the bottom, which mechanism is actuatable from the upper side of the container, two actuating rings projecting from the upper side of the container and being grippable by a truck crane for raising the container for the purpose of emptying. By lowering one of the rings relative to the other ring, the bottom flaps, connected to the lowered ring, are pressed downwardly by the weight of the filling material, so that the bottom opens.

Such containers have proved themselves as collecting containers for reusable material. By the increasing awareness of the environment, it is sought to collect ever more substances in corresponding containers, in order to effect recycling thereof. Since different types of material should not be collected together in one container, a special container must be provided for each type of material. It is therefore also known to construct such containers as multi-chamber containers, provided with a partition wall. It has been found, however, that at different points of use, different numbers of types of material have to be collected. This has the consequence that a large number of different types of container are necessary and that containers with three or more chambers are required at many points of use. The formation of a container with a one-piece upper structure as a multi-chamber container with three or more chambers involves manufacturing technology difficulties and, moreover, requires a high manufacturing cost.

In an alternative form of embodiment to the above-described prior art collecting containers, the container is made of two half shells, which are connected together by a hinge at the upper side of the container. The container thus has no bottom, but is emptied by the two half shells being separated from one another, whereby a gap is produced in the middle of the container through which the filling material can fall from the container. Such containers are relatively difficult to empty and involve substantial handling problems.

It is accordingly an object of the present invention to provide a novel type of collecting container of the first-mentioned type, which can be easily manufactured, has a high stability and variability, and can be handled in a reliable manner.

According to the present invention, this object is achieved in that the upper structure is formed by two housing halves facing one another and connected to one another by means of a connecting profile, which holds the housing halves together and which extends around the upper structure in a vertical plane.

The collecting container according to the invention thus comprises the upper structure, which is formed by two housing halves, which are fixedly connected together by the connecting profile. The housing halves are thus not pivotable for emptying of the container. The emptying of the container, furthermore, is effected by a swingable bottom in the base of the container, which is preferably formed by two opposed bottom flaps. In a particularly preferred embodiment, the housing halves are identical parts, so that the connecting profile extends in the plane of symmetry of the housing halves. The connecting profile serves not only for the connection of the two housing halves, but also for the stiffening and the stabilization of the housing.

The connecting profile preferably extends over end closure walls of the upper structure, which bulge outwardly. The connecting profile, therefore, includes corresponding bulges. The best stability is achieved if the base is formed substantially rectangular and the longitudinal sides extend parallel to the connecting profile. The connecting profile in that case extends, if required, over the bulge in each end wall to the rectangular base, and terminates there.

The housing halves can be produced at lower cost than a one-piece upper structure. Consequently, the container can also be formed, without problems, as a multi-chamber container with longitudinal sides of the required length, the partition walls extending vertically and perpendicular to the vertical plane of the connecting profile.

In a preferred embodiment, comprising a container with a plurality of insertion openings, each insertion opening is associated with a container section which is defined by a vertical stiffening corrugation arranged in the front side of the container between two of the insertion openings, which corrugation extends into a horizontal stiffening corrugation extending perpendicular to the partition plane. In this way it is ensured that the function of the container for receiving different material fractions is made optically visible.

In a particularly preferred embodiment, the upper structure has, at a lower edge, a U-shaped groove extending parallel to the base, in which there is inserted a reinforcing profile. The U-shaped groove with the reinforcing profile, which preferably is also U-shaped, effect a substantial stiffening of the upper structure of the container in the region of the base. Furthermore, the reinforcing profile may be utilized for securing the hinges for the pivotable bottom, the hinges preferably being applied to the longitudinal sides of the upper structure.

When the actuating mechanism is secured to the pivotable bottom at the connecting profile, all of the parts required for the handling of the container are secured to the two profiles, so that additional fittings at the container walls, which may for example be made of plastic material, are not necessary. The connecting profile and the circumferential reinforcing profile form a skeleton for the container which therefore is supplemented by the container walls, which are preferably made of plastics material. The stability of the container is thus provided substantially by the skeleton formed from the two profiles.

The connecting profile is preferably provided with downwardly open U-shaped profile parts at its two edges, which parts engage over flanges on the housing halves and are connected together by an upwardly open U-shaped profile part. The flanges of the housing halves are preferably L-shaped and are also located at the respective outer webs and the bottom of the associated U-shaped profile parts of the connecting profile. The connection of the two housing halves is also suitably effected by a pot-shaped securing profile, which engages under the upwardly open profile part of the connecting profile and the horizontal ends of the L-shaped flanges of the housing halves and is secured to the connecting profile, so that the flanges of the housing halves are fixably clamped in the U-shaped profile parts.

The manner of construction of the collecting container according to the invention permits a substantial variation of the container. This is, for example, possible if the two housing halves are constructed of a plurality of parts, each with a casing wall and two end wall halves. The length of the container then, if it has identical end wall halves, can be varied by employing different lengths of casing wall. The corresponding modification of the profile is not a problem, since the profile can be readily adapted to different profile lengths.

The variation of the length of the casing wall does not necessitate manufacture of different casing wall parts if the casing wall also comprises a plurality of casing parts connected to one another at vertical separation gaps. In this case, it is possible to produce a casing part of a predetermined basic length, and merely to connect together, depending upon the desired container length, a corresponding number of the casing parts and to add the end wall halves.

Also, each casing part preferably has a casing wall provided with a filling opening.

In a preferred form of the casing wall of the collecting container according to the invention, the casing wall is formed in the shape of a prism, with a wall portion extending vertically relative to the base, a horizontal wall portion having the connecting profile, and an inclined wall portion connecting together the other two portions, the insertion opening being located in the inclined wall portion. With this form of the casing wall, the bulging of the end wall is preferably likewise in the shape of a prism and is realized by juxtaposed flat wall parts.

The advantages of the collecting container according to the invention are particularly great if the container is utilized as a multi-chamber container. In order to identify the different chambers and in order not to have to make the container in different colours, cover parts are arranged over the insertion openings, which each have an opening aligned with a respective insertion opening and the upper surfaces of which bear a marking which is different from the surface of the casing surface of the container, the markings of the cover parts of different chambers likewise being different. Preferably, the cover parts are made of distinctive colours. The cover parts, furthermore, have the function that they protect the edges of the insertion openings which, for example in the case of glass collecting containers, are subject to extensive wear. If the openings of the cover parts become worn, then these parts can readily be replaced.

In the prismatic shape of the container, the cover part preferably extends from the horizontal wall portion, over the inclined wall portion to the vertical wall portion of the casing wall.

The formation of the collecting container according to the invention as a multi-chamber container is effected by at least one partition wall extending perpendicular to the plane of the connecting profile. The bottom is correspondingly divided into a plurality of bottom parts, each separating gaps of which is aligned with a respective partition wall.

The variability of the container according to the invention is increased if the vertical wall portion of the casing wall is provided with uniformly spaced stiffening corrugations and the bottom is provided with stiffening corrugations forming extensions of the stiffening corrugations of the casing part. These stiffening corrugations serve, on one hand, for the stabilization of the vertical wall parts and, on the other hand, can advantageously be used for securing the partition wall if the partition wall is so secured to the stiffening corrugations of the casing part that the partition wall, when the bottom is in its closed condition, is aligned with a stiffening corrugation in the bottom and facing towards to the interior of the container.

A container of this type which has once been arranged as a multi-chamber container can readily have its chamber division altered if the partition wall is secured to a different stiffening corrugation in the container. This can be effected with a few screws. In the same way, the bottom can be rearranged and, if required, a longer bottom part can be employed in the bottom, whereby the chamber division is ready altered.

The containing profile, provided according to the invention, can undertake an additional function when it projects beyond the surfaces of the end walls. In many applications, a plurality of such multi-chamber containers are juxtaposed. The alignment is usually effected in the longitudinal direction of the containers. When the containers, which are raised by a crane for emptying, are replaced in the aligned position, they often strike one another. Consequently, slight hair-line cracks are produced in the plastic material wall, which widen in the course of time. This stressing of the plastic material walls is avoided by the connecting profile projecting from the end walls, since during alignment of the two collecting containers, the connecting profiles help to substantially avoid direct contact of the plastic walls of the containers. To facilitate the alignment of the two containers relative to one another, a guide wedge can be inserted into the outwardly facing U-shaped groove of the connecting profile in the vicinity of the end wall, which wedge has an outwardly conically tapering part projecting from the groove, which can engage in a corresponding outwardly facing U-shaped groove in the connecting profile of the adjacent container, so that the guide wedge serves as a centering means.

The invention will be more readily understood from the following description of preferred embodiments thereof given, by way of example, with reference to the accompanying drawings, in which:

FIG. 9 shows a plan view of two insertion openings in the casing wall, with cover parts located thereon;

FIG. 10 shows a view in cross-section through the wall arrangement shown in FIG. 9;

FIG. 22 shows a section of a partition wall in a perspective illustration;

FIG. 23 shows the arrangement of a partition wall in a diagrammatic illustration;

Figure 1:
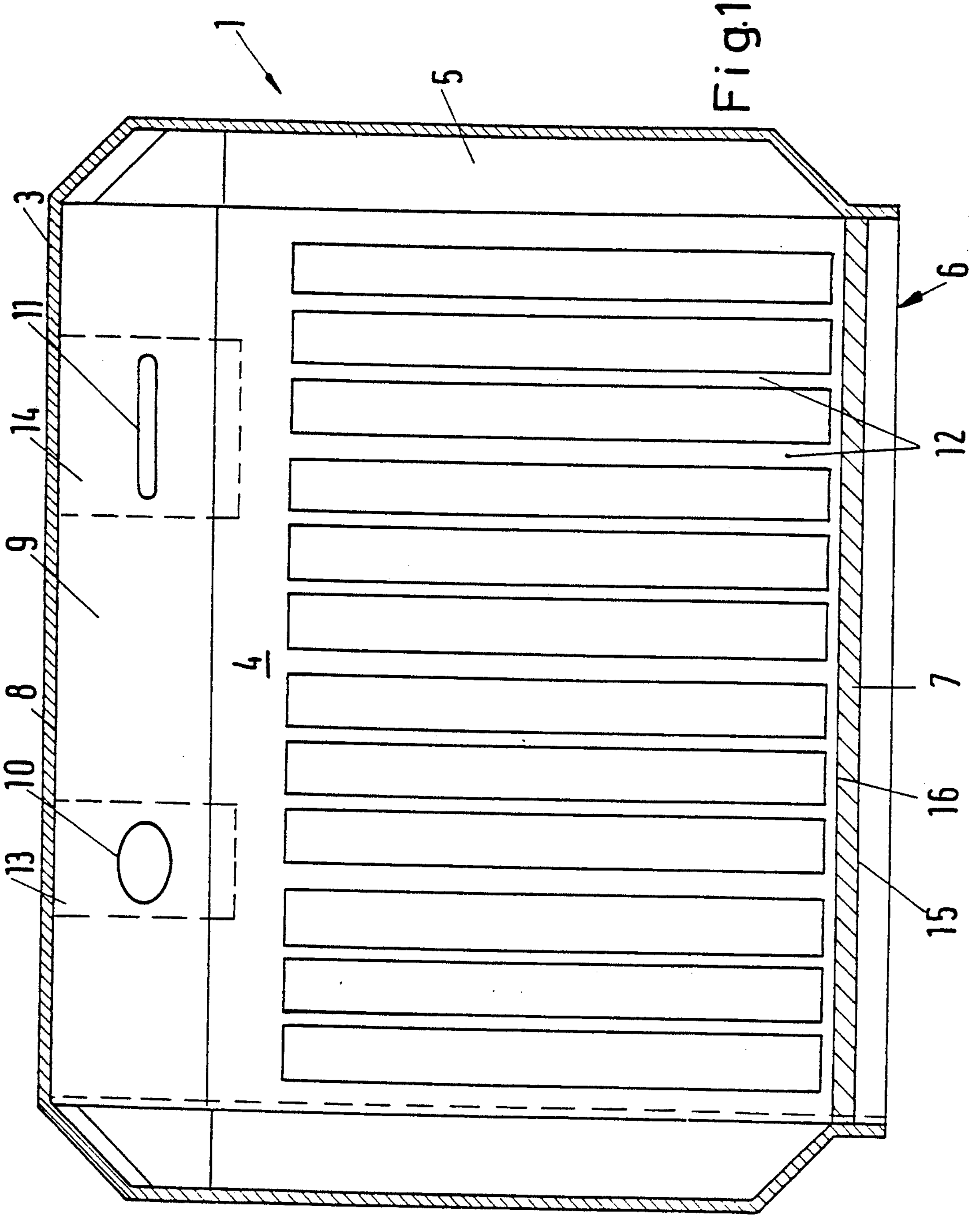
FIG. 1 shows a view in elevation of a longitudinal side of a collection container embodying the invention.
Figure 2:
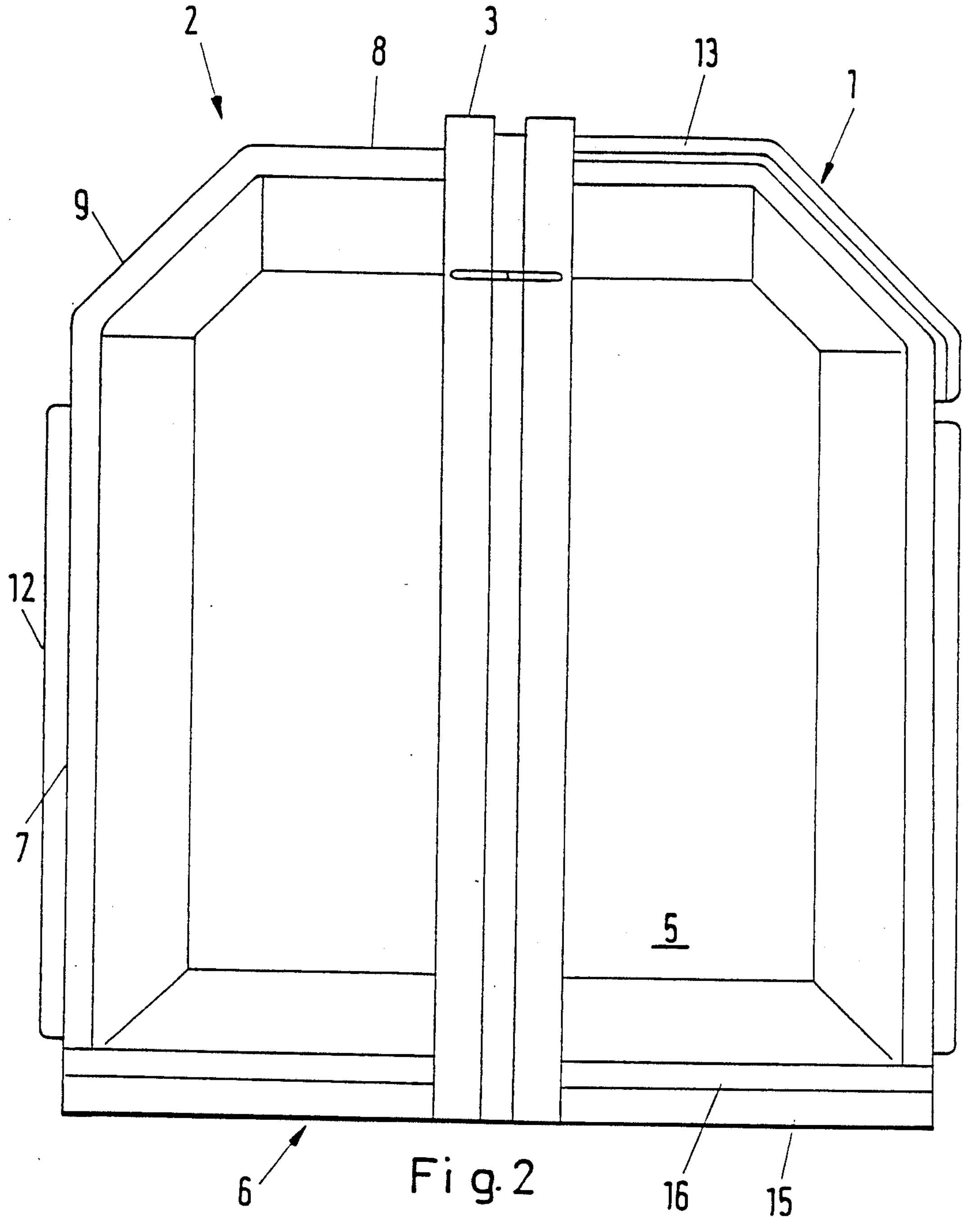
FIG. 2 shows a view in elevation of an end of the container of FIG. 1.

The collection container illustrated in FIGS. 1 and 2 has two housing halves 1, 2, which are similarily formed and which are connected together by a circumferential connecting profile 3. The housing halves 1, 2 each form a half casing wall 4 and end halves 5. The end halves 5 each have an outwardly extending bulge, which is realized in the form of a prism by flat surfaces. The connecting profile 3 has, likewise, a corresponding bulge in the region of each end wall 5. The housing halves 1, 2 form a rectangular base 6, on which the two ends of the connecting profile 3, which extends around in the vertical plane, terminate. The casing walls 4 each comprise a vertical wall portion 7, which extends to the base 6, a horizontal wall portion 8, which has the connecting profile 3, and an inclined wall portion 9, which connects the wall portions 7, 8. Insertion openings 10, 11 are arranged in the inclined wall portion 9.

The vertical wall portions 7 are provided with uniformly spaced stiffening corrugations 12, which alternatively face the container interior and the container exterior.

The insertion openings 10, 11 are covered by respective cover parts 13, 14, which have openings coinciding with the respective insertion openings 10, 11.

At the lower edge of the collecting container, parallel to the rectangular base, there extends a U-shaped groove 15, in which a preferably likewise U-shaped reinforcement profile 16 is inserted.

The connecting profile 3 and the reinforcement profile 16 form a frame for the container, which substantially determines the static properties of the container. The stability of the casing wall 4 or end walls 5 is produced by the bulging shape of these wall portions and by the stiffening corrugations 12 in the vertical wall parts 7, which may be relatively long.

Figure 3:
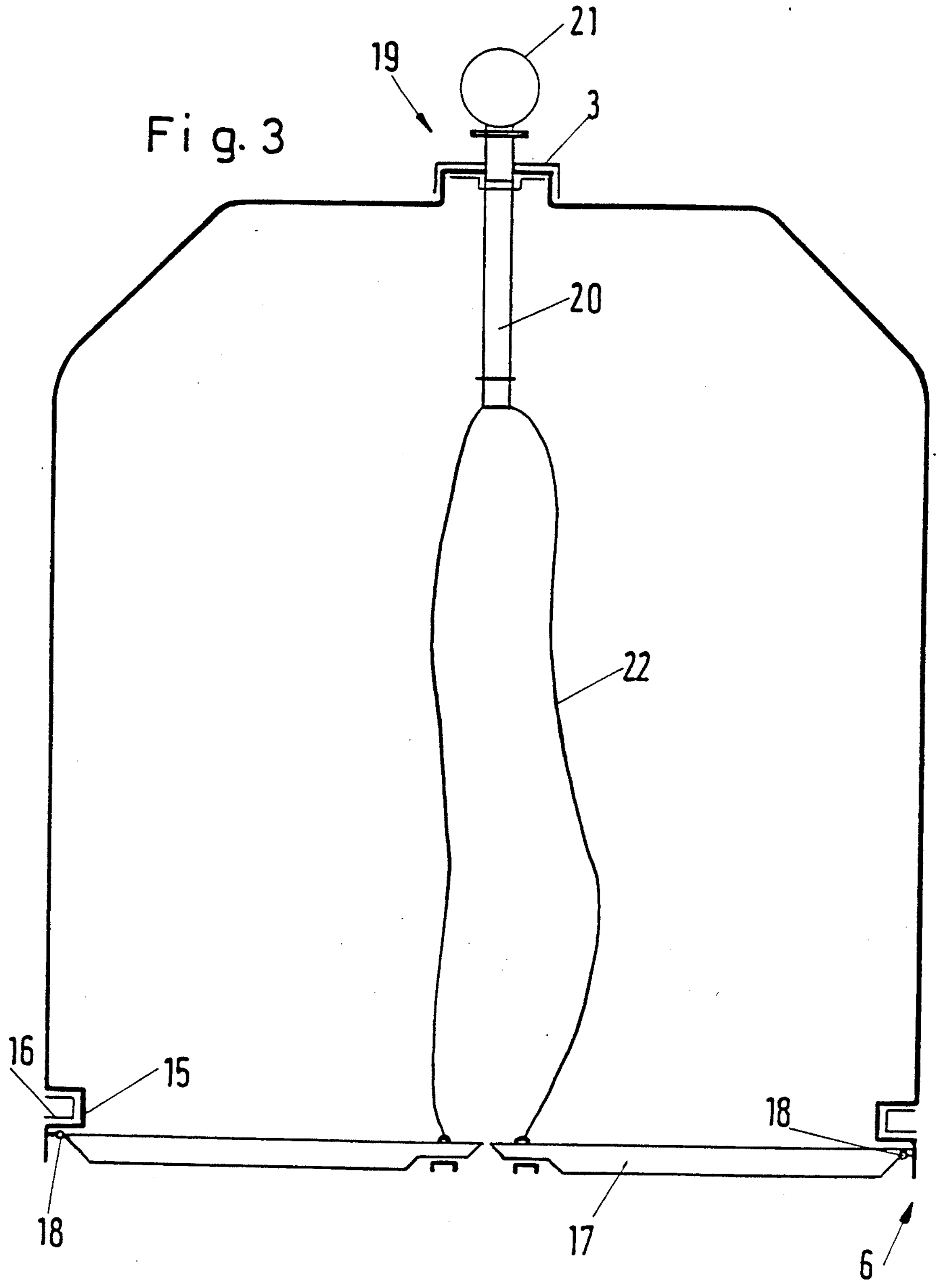
FIG. 3 shows a view taken in cross-section parallel to the end of a container.

FIG. 3 shows that the upper structure of the housing, formed substantially by the housing halves 1, 2, is open towards the base 6 and is there closed by means of two bottom flaps 17. The bottom flaps are secured in a downwardly swingable manner to the circumferential U-shaped reinforcement profile 15 by means of hinges 18 extending along the longitudinal sides of the container. The hinges 18 thus extend parallel to the plane of the connecting profile 3.

FIG. 3 furthermore illustrates that the connecting profile 3 bears, at the top, an actuating mechanism 19 for the bottom flaps. The actuating mechanism comprises, in a known manner, a slidable rod 20, which projects through the top of the container and which can be gripped, at the top of the container, by means of an actuating ring 21. At the lower end of the slidable rod 20, there are provided wires 22 which are connected with the ends of the bottom flaps 17 which are directed towards the middle of the housing.

At the top of the housing, a second actuating ring, which is not illustrated in FIG. 3, is fixedly arranged.

For emptying the container, the container is engaged at the actuating ring 21 by means of a crane and is raised. The rod 20 is thereby pulled upwardly, so that the actuating wires 22 are tightly tensioned and the bottom flaps 17 are retained in a closed state. A further crane hook is engaged in the second, stationary actuating ring. When the collecting container is disposed above the loading surface of a truck, the container is held by the second actuating ring and the first actuating ring 21 is lowered, so that the bottom flaps 17 are displaced downwardly by the weight of the filling material and the container is opened, whereupon the filling material falls downwardly from the container. By again raising the actuating ring 21, the bottom flaps 17 are again closed and the container can again be located in its standing position. Both actuating rings can be guided or held on the connecting profile 3 so that additional fittings on the housing halves 1, 2 are not necessary.

Figure 4:
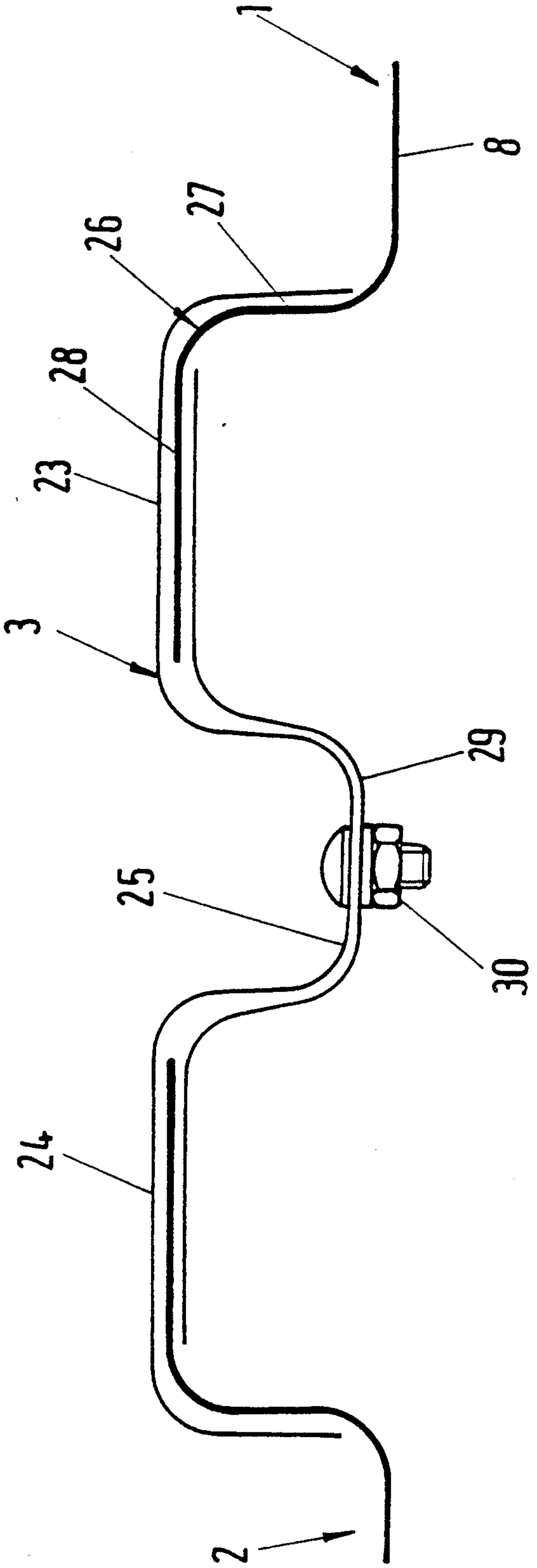
FIG. 4 shows a view taken in cross-section through the connecting profile, with the ends of the container halves held by the connecting profile.

FIG. 4 illustrates in detail the connection of the two housing halves 1, 2 by means of the connecting profile 3. The connecting profile 3 comprises, in cross-section, downwardly open profile parts 23, 24 at its edges, which are connected to one another by an intermediate, upwardly open profile part 25. The two housing halves 1, 2 are provided at their juxtaposed edges with L-shaped flanges 26, which have vertical webs 27 projecting beyond the horizontal wall portion 8 into horizontal webs 28. The vertical webs 27 about the respective outer webs of the U-shaped profile part 23, 24, while the horizontal webs 28 abut the bottom of the U-shaped profiles parts 23, 24. For connecting the two wall halves 1, 2, there is provided a pot-shaped profile 29 which, on one hand, engages beneath the middle U-shaped profile part 25 and, on the other hand, engages beneath the two horizontal webs 28 of the L-shaped flanges 26. The pot-shaped securement profile 29 is secured at the bottom of the U-shaped profile part 25 of the connecting profile 3 by bolts 30 and thus retains the horizontal webs 28 and, therewith, the vertical webs 27 within the U-shaped profile parts 23, 24.

Figure 5:
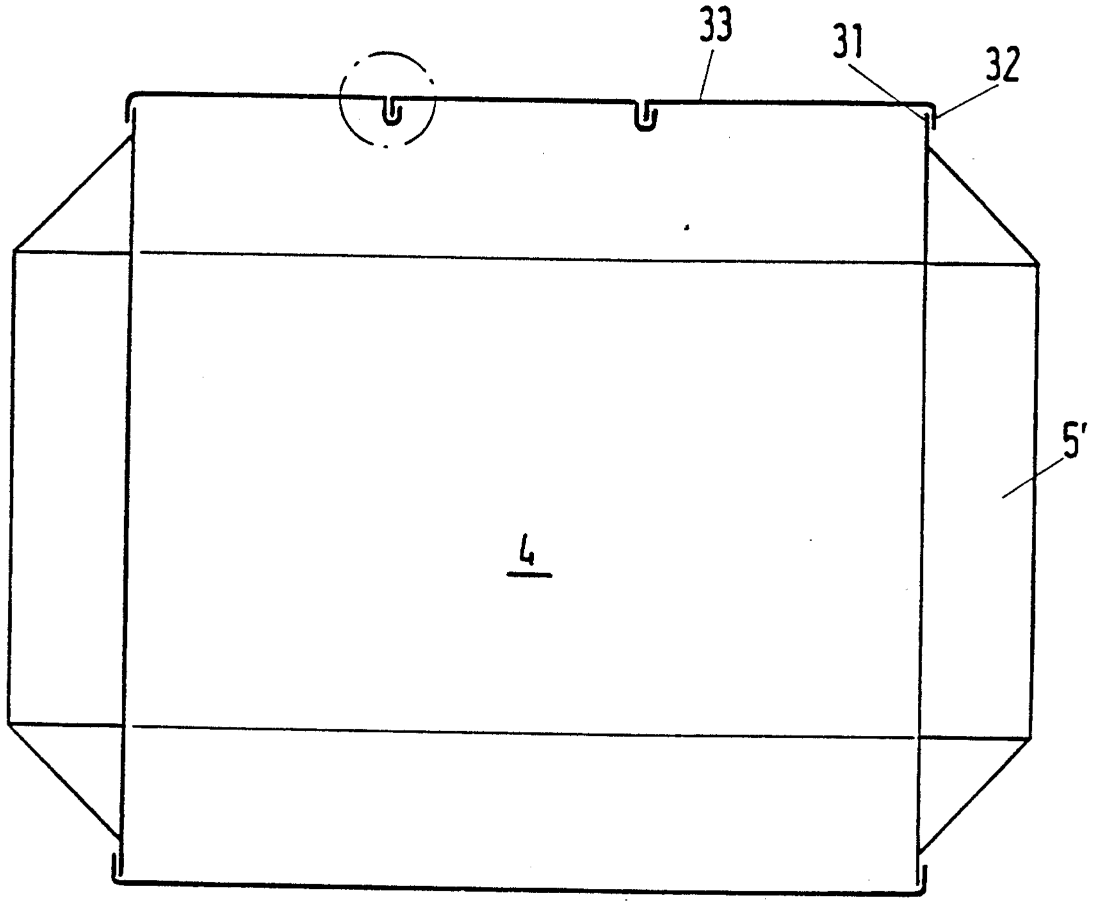
FIG. 5 shows a horizontal section through a container constructed with a casing wall having a plurality of casing parts, and with separate end walls.

Because of its construction with the connecting profile 3, and if required, the reinforcement profile 16, the collection container according to the invention can be constructed, without problems, in a plurality of parts. FIG. 5 diagrammatically illustrates such a multi-part construction, in which the end wall 5 (formed by two end wall halves and the connecting profile 3 connecting the two end wall halves) engages by means of webs 31 behind inwardly bent flanges 32 of the casing wall 4.

Since FIG. 5 shows the multi-part construction of the casing wall 4 only diagrammatically, the illustration of the connecting profile 3 is omitted for the sake of clarity.

In addition, the casing wall 4 can be formed from a plurality of casing parts 33, which are hooked into one another by corresponding formation of the vertical end pieces, as shown in FIG. 5 as a horizontal cross-section in the upper portion of the illustration, i.e. within the circle which has been drawn in.

It is apparent, without further comment, that casing walls 4 of different lengths can be formed from the casing parts, and can be closed by the end walls 5' illustrated in FIG. 5.

Figure 6:
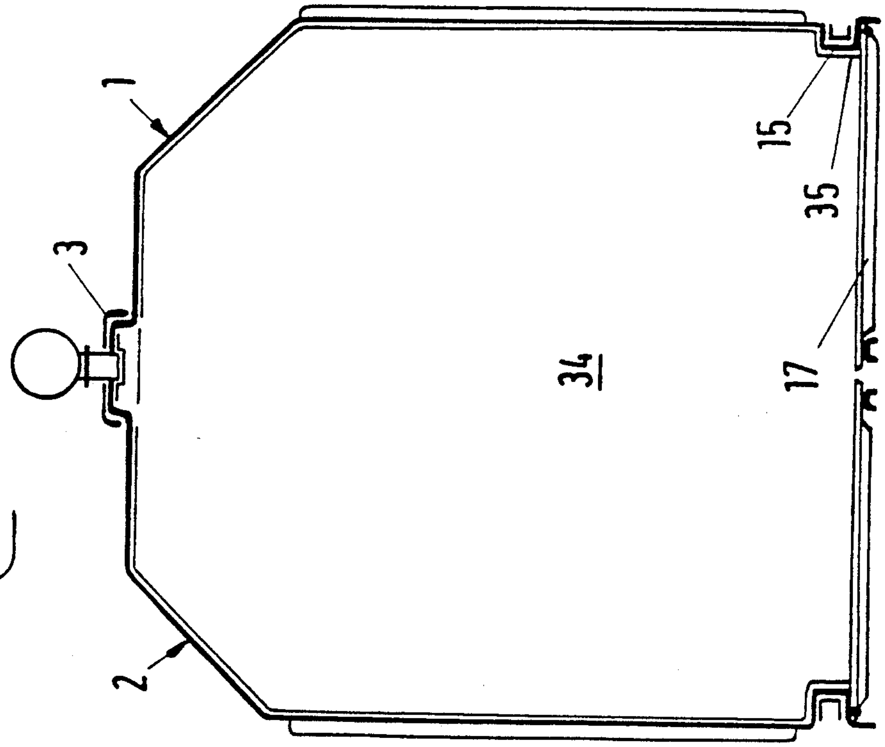
FIG. 6 shows a view taken in vertical section through a multi-chamber container, facing an end wall.
Figure 7:
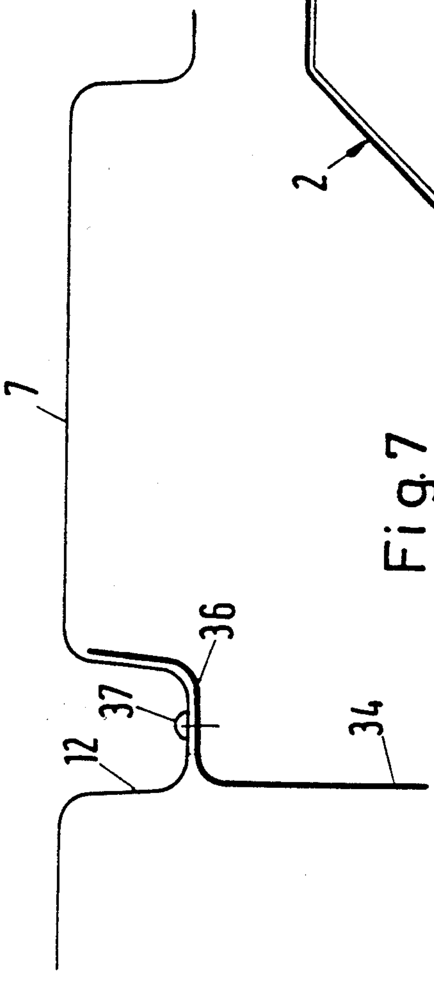
FIG. 7 shows a detail of the lateral securement of the end wall to a corrugation of the casing wall.
Figure 8:
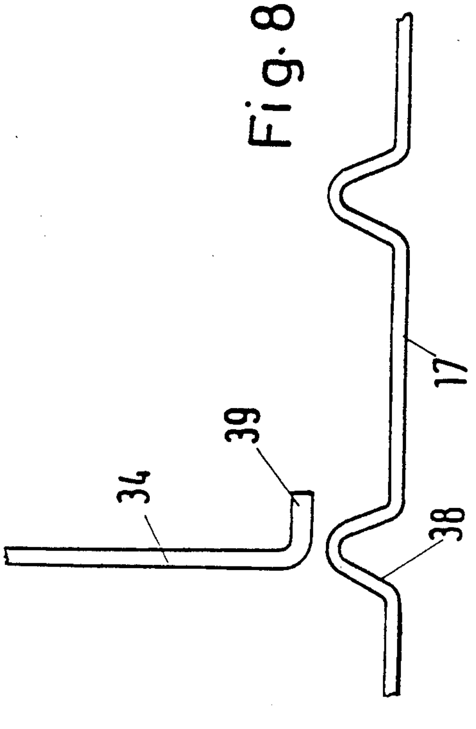
FIG. 8 shows a diagrammatic illustration of the lower end of a partition wall and the associated bottom part.

FIGS. 6 to 8 show the arrangement of a partition wall 34 in a container according to the invention, whereby the latter is converted into a multi-chamber container. FIG. 6 shows that the partition wall 34 extends perpendicular to the plane of the connecting profile 3, and fills the entire cross section of the container and also has a cutout 35 corresponding to the U-shaped groove 15.

The securement of the side wall to the casing walls 4 is effected, as shown in FIG. 7, at the inwardly directed corrugation 12 of the vertical wall portion 7. For this purpose, the inner partition wall is provided at its sides, in the vicinity of the vertical wall portions 7, with an L-shaped flange 36, which engages around the bottom and a side wall of the corrugation 12 and which is fixed to the bottom of the corrugation 12 by means of a screw 37 or the like.

FIG. 8 shows the end of the partition wall 34 above a bottom flap 17, which is likewise provided with an inwardly projecting corrugation 38, which is substantially aligned with the inwardly projecting corrugation 12 in the vertical wall portions 7.

The partition wall 34 is substantially aligned with the corrugation 38 in the bottom flap 17 and is provided at its lower end with a bend 39, which improves the chamber separation in the vicinity of the bottom.

FIGS. 9 and 10 show the arrangement of cover parts 13 over the insertion openings 10. Openings 40 in the cover parts 13 are aligned with the respective insertion openings 10 and thereby provide a protection for the edges of the insertion openings 10. The cover parts 13 also have the function of providing a marking or indication for the type of material to be collected through the respective insertion opening 10. For this purpose, the covers 13 can preferably be coloured differently from the casing wall 4.

FIG. 10 shows, in a sectional illustration, that the cover part 13 illustrated therein preferably extends over the horizontal wall portion 8, and the inclined wall portion 9 to the upper edge of the vertical wall portion 7, and projects forwardly by approximately the depth of the projection of the corrugations 12. At their upper edges, the cover parts 13 preferably abuts the connecting profile 3.

Figure 11:
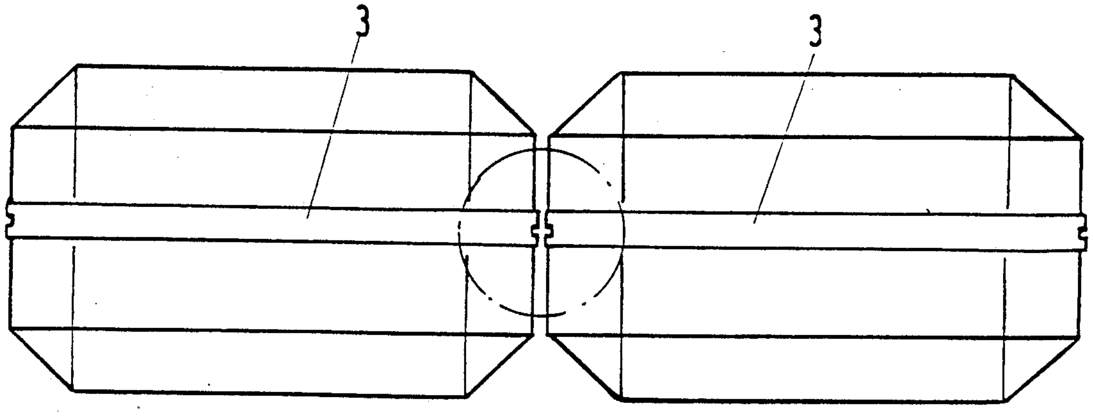
FIG. 11 shows a schematic illustration of the alignment of two collection containers embodying the present invention.
Figure 12:
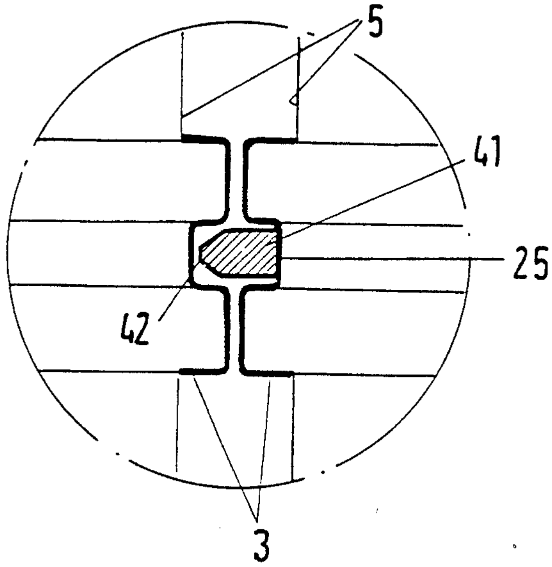
FIG. 12 shows a detailed illustration of a centering means for the alignment of the two collection containers.
Figure 13:
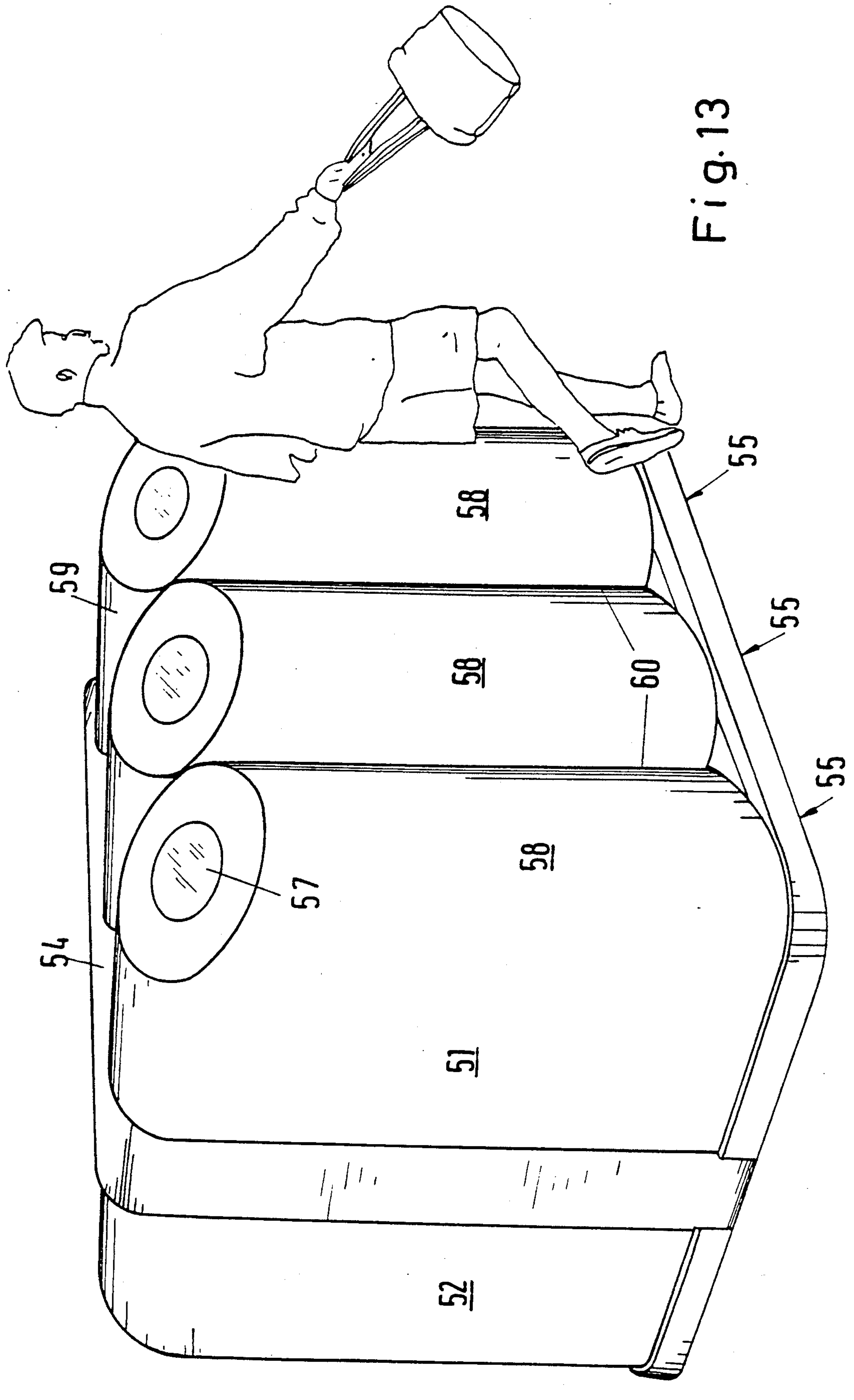
FIG. 13 shows another embodiment of a collection container.
Figure 15:
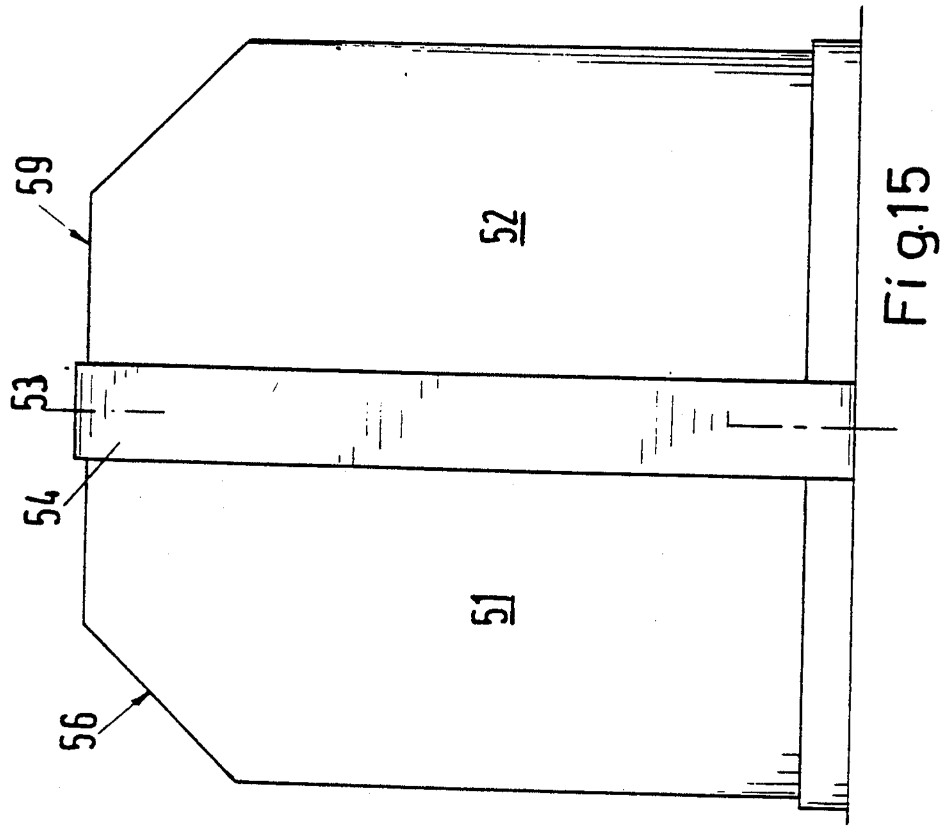
FIG. 15 shows the collection container of FIGS. 13 and 14 in end elevation.
Figure 14:
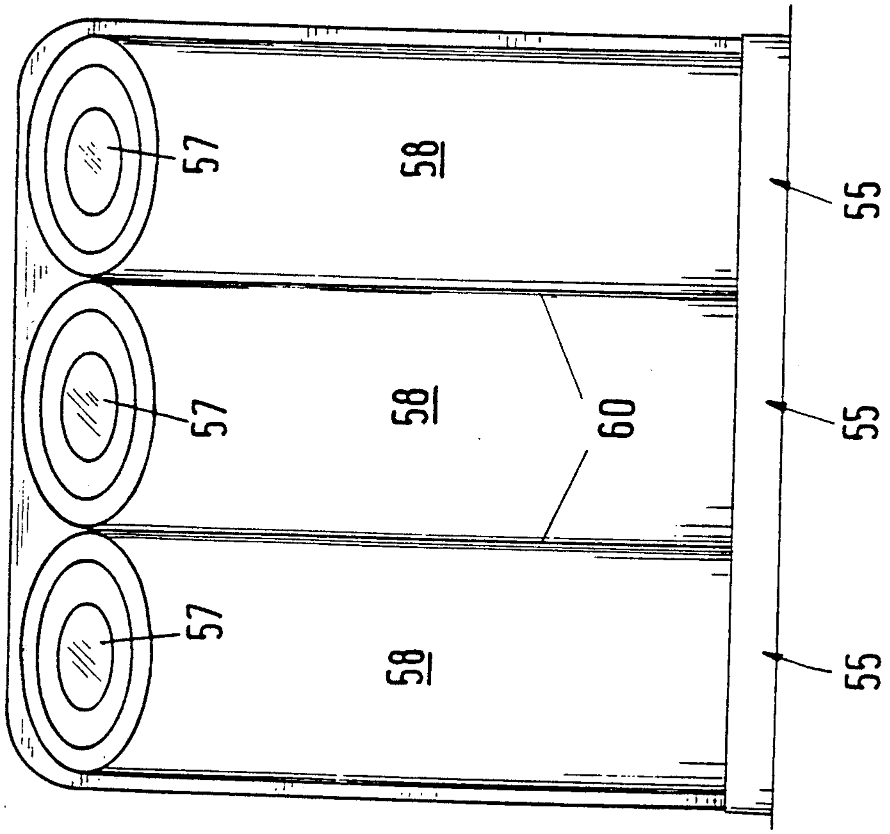
FIG. 14 shows a collection container according to FIG. 13 in front elevation.
Figure 16:
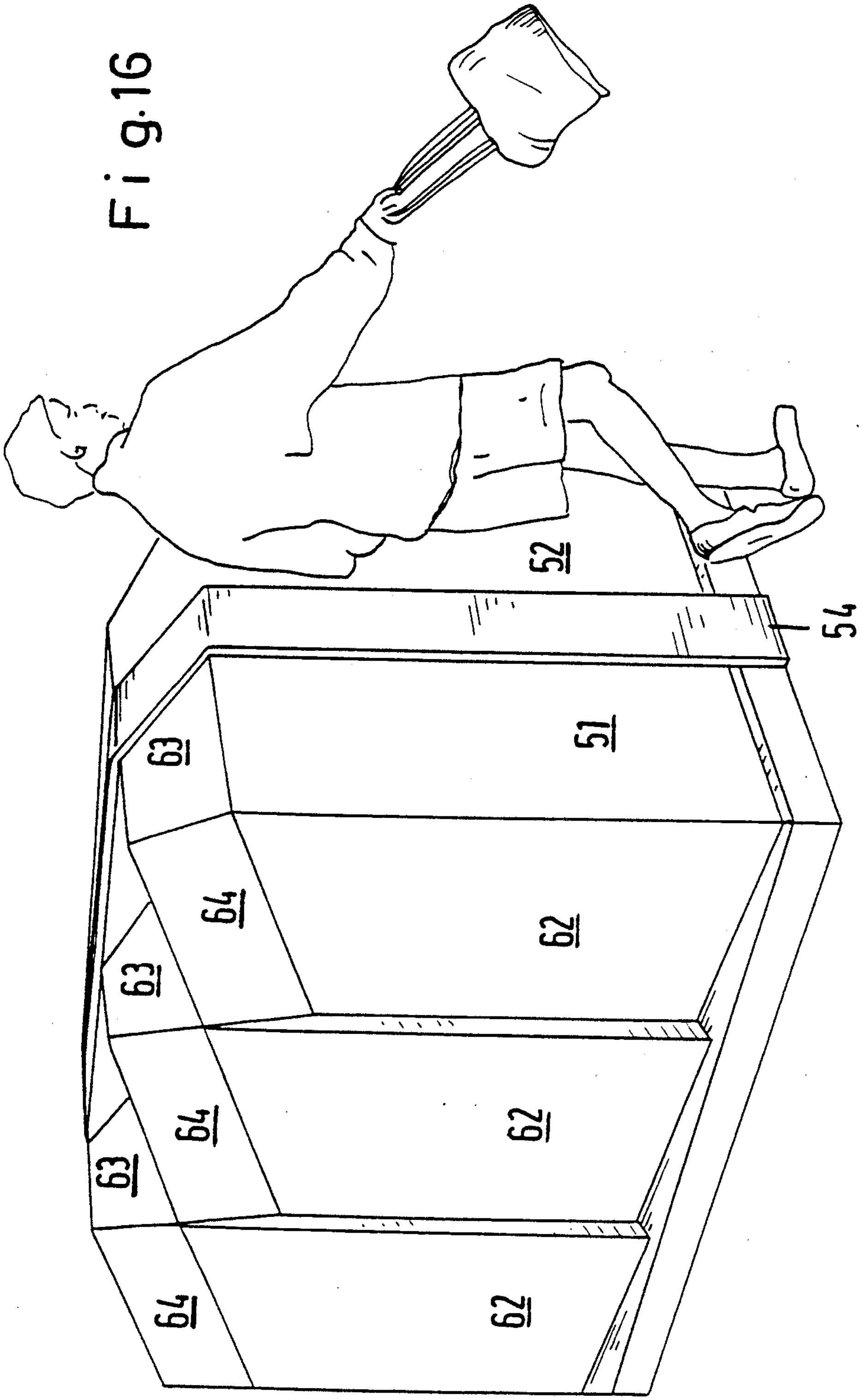
FIG. 16 shows a modified embodiment in an illustration corresponding to FIG. 13.

FIG. 11 illustrates the preferred alignment of the container for the case in which two containers are juxtaposed. The alignment is effected so that the connecting profiles 3 are aligned. FIG. 12 shows a detailed view corresponding to the circle drawn in FIG. 11. It can be seen therefrom that each connecting profile 3 projects beyond the surface of its end wall 5 and that, in the outwardly open U-shaped profile portion 25 of one of the connecting profiles 3, a guide wedge 41 can be inserted, which is preferably made of resilient material, for example rubber. An end 42 of the guide wedge 41 which projects from the profile part 25 is conically tapered and forms, by engagement in the outwardly open profile part 25 of the other container, a centering means for the relative location of the containers. When the containers are juxtaposed, the two connecting profiles contact one another so that direct contact of the plastic material end walls 5 is avoided.

The collection container illustrated in FIGS. 13, 14, 15 and 19 comprises two similarily formed housing halves 51, 52, which form the upper structure of the collection container and which abut one another at a vertical separation plane 53, which extends parallel to the front and rear sides of the collection container. The connection of the two housing halves 51, 52 is effected by means of a cover profile 54, and is described below in greater detail.

The collection container comprises three container sections 55, each of which is provided with an insertion opening 57 in an upper, inclined container wall 56. The inclined container wall 56 connects a vertical section 58 provided in the front of the container with a horizontal section 59 located at the top of the container. The diameter of the insertion opening 57 corresponds, at most, to the width of a section 58, 59 or a container section 55. The two sections 58, 59 are formed approximately circularly curved in cross-section. The separation between each two container sections 55 is effected by means of a vertical corrugation 60 arranged in the front of the container between two insertion openings 57, which corrugation extends into a horizontally extending corrugation 61, perpendicular to the separating plane 53, in the top of the container.

Figure 18:
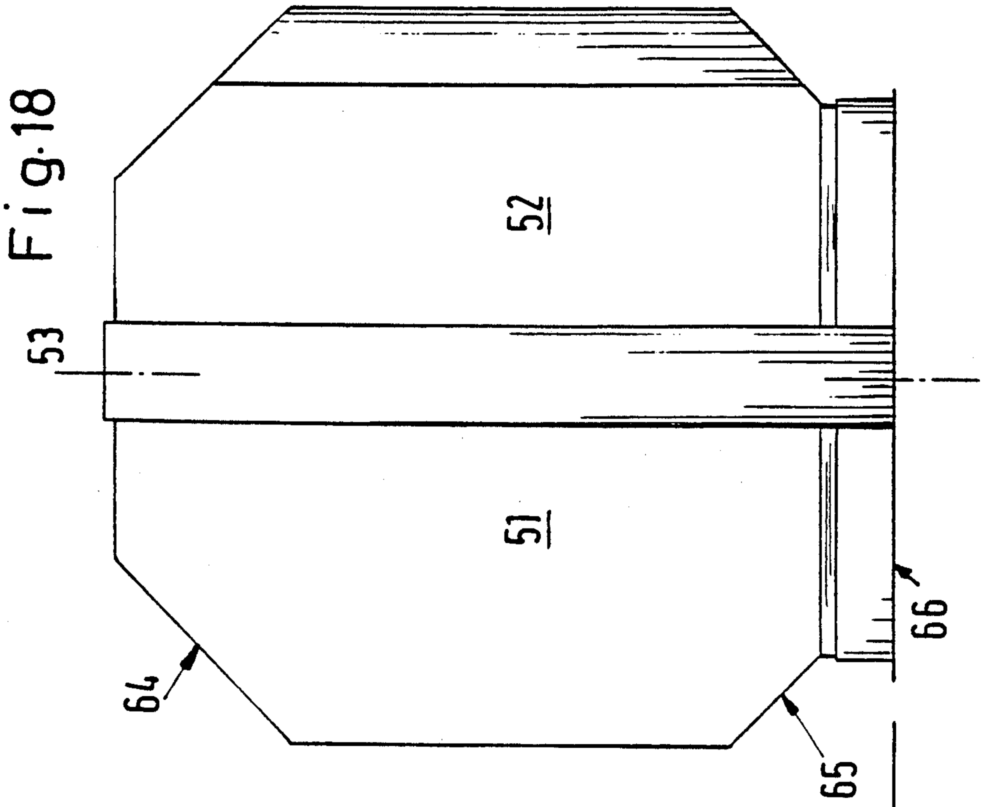
FIG. 18 shows the collection container of FIGS. 16 and 17 in end elevation.
Figure 17:
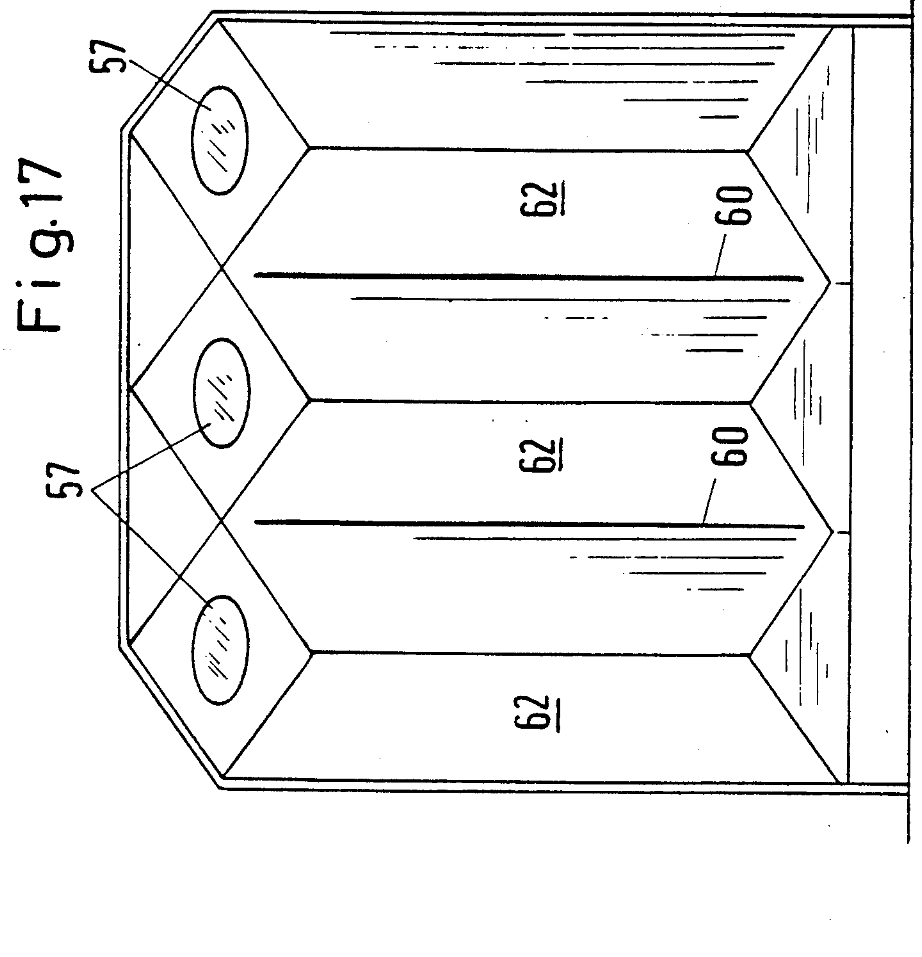
FIG. 17 shows the collection container of FIG. 16 in front elevation.
Figure 19:
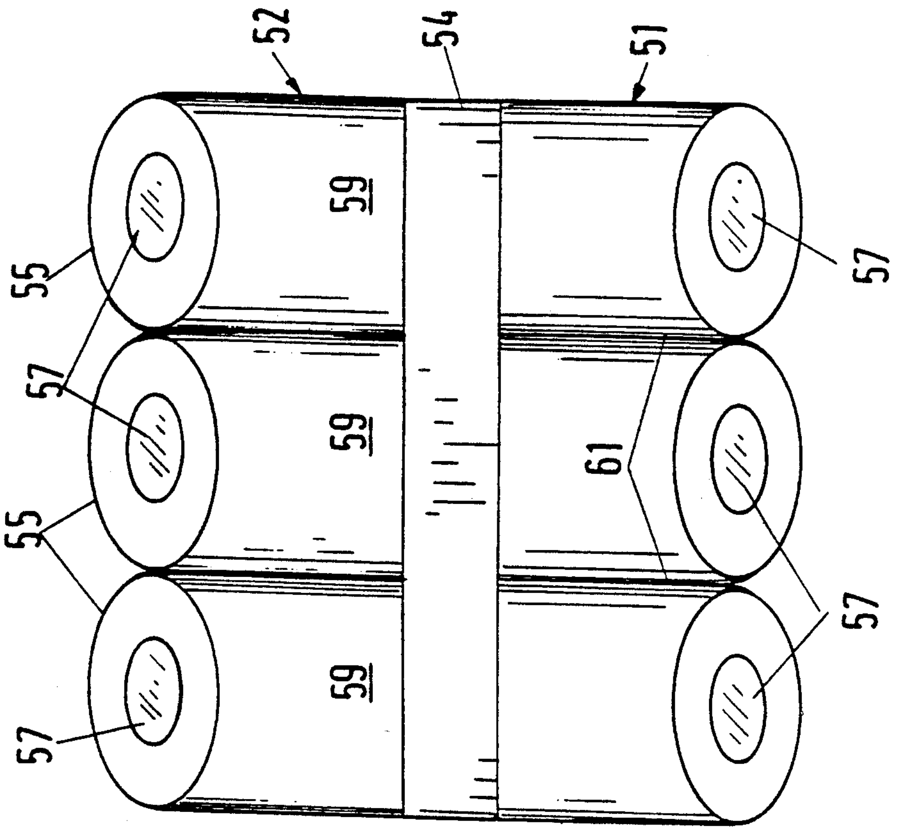
FIG. 19 shows the collection container of FIGS. 13 to 15 in plan view.
Figure 20:
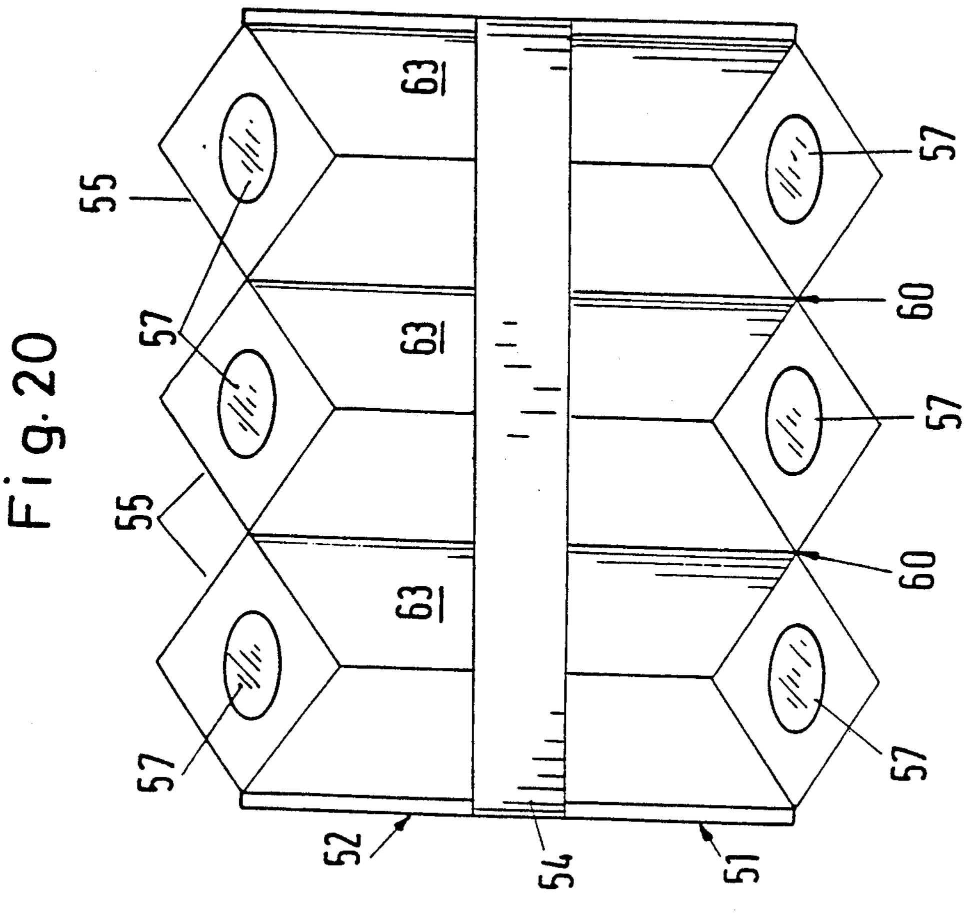
FIG. 20 shows the collection container according to FIGS. 16 to 18 in plan view.

FIGS. 16, 17, 18 and 20 show a modified embodiment of the collection container, which however is unchanged in its basic construction. However, a vertical section 62, corresponding to the container section 55, in the front of the container, like a horizontal section 63 in the top of the container, is formed approximately triangular in cross-section. An upper, inclined container wall 64, connecting together the two sections 62, 63 and accommodating an insertion opening 57, is formed in a the shape of a rhombus, while the associated lower closure surface 65 is formed as an inclined triangular surface. FIG. 18, in particular, shows that the vertical section 62 in the front of the container projects beyond the base 66 of the container. Also, in this embodiment the separation occurs between two container sections 55 occurs by means of the circumferential vertical and horizontal corrugations 60, 61.

Figure 21:
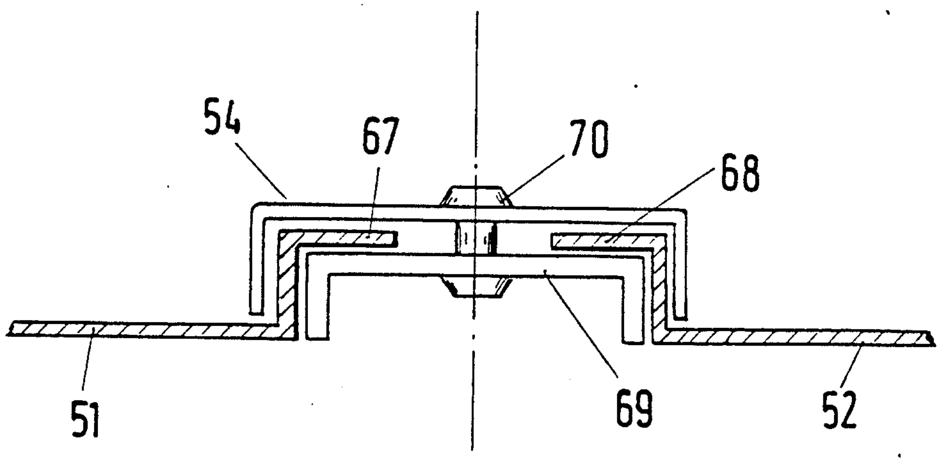
FIG. 21 shows, in an enlarged scale, a detail in cross-section.

FIG. 21 shows that the opposite edges 67, 68 of the two housing halves 51, 52, which are also otherwise similarly formed, are angled in Z-shape and engaged beneath the above-mentioned U-shaped cover profile 54. This cover profile 54 is clamped by connecting means 70 to an inner profile 69, which is likewise formed U-shaped and which engages beneath the free edges 67, 68, the connecting means being shown, in the present embodiment, as a rivet. While the two housing halves 51, 52 are constructed for plastics material, the cover profile 54 may comprise sheet metal or plastics material and the inner profile 69 may comprise steel.

If the collection container is employed as a monocontainer, the inner space of the container does not require division. However, if separate chambers are required, partition walls 71 can be arranged between the circumferential corrugations 60, 61 (see FIGS. 22, 23) which can then, for example, be riveted to the container walls.

Figure 24:
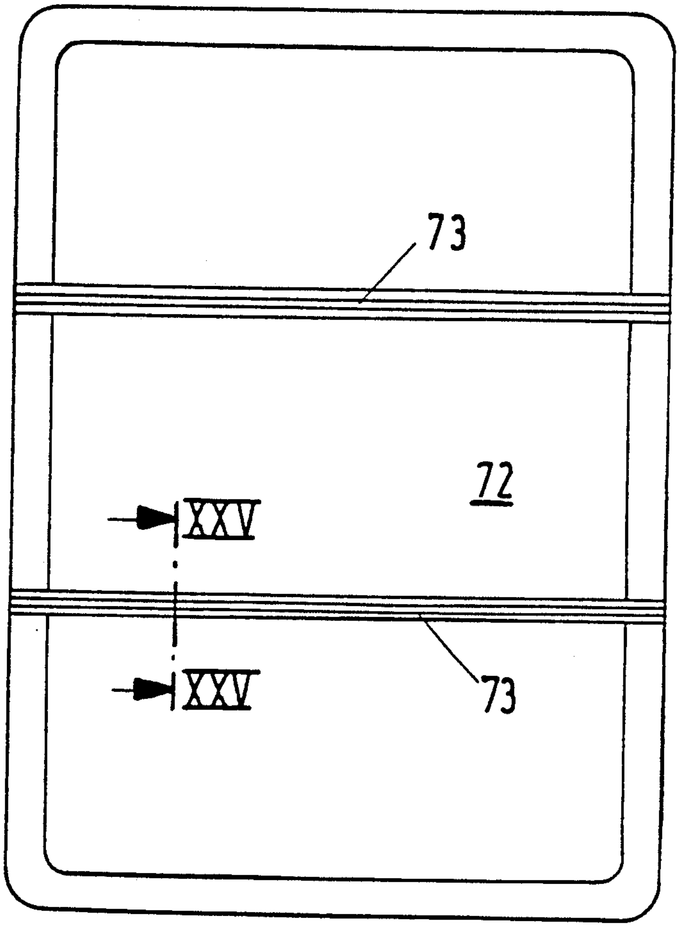
FIG. 24 shows a collecting container according to FIGS. 13 to 15 in an underneath plan view.
Figure 25:
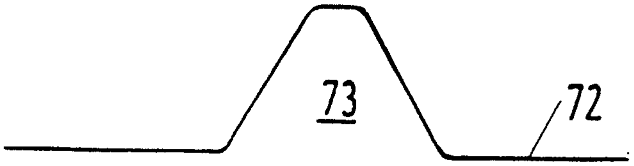
FIG. 25 shows, in an enlarged scale, a section taken along the line XIII—XIII of FIG. 24.

The container bottom is formed by a bottom flap 72 (see FIG. 24) which is pivotally connected to a housing half 51 at a side extending parallel to the separation plane 53. When the collection container is used as a monocontainer, this bottom flap 72 can be formed in one piece. However, when one or more partition walls 71 are utilized, each container chamber formed thereby must have a separately operable bottom flap. In order to be able to do this even subsequently, like the inclusion of the partition walls 71, separating lines or projections are provided in the bottom flap 72, which extend perpendicular to the separation plane 53 and which are aligned with respective corrugations 60, 61. FIG. 25 shows that these separating lines can be formed by molded corrugations. The insertion openings 57 may have different sizes and/or shapes and are, for example, round for receiving glass, cans or the like, and oval for receiving paper or textiles. The insertion openings 57 can be parts of an additional element, which can be inserted into the upper inclined container wall 56 or 64 and which can be made coloured and are provided with user information.

The bottom flap 72 can be divided in the region of the separating plane 3, the two halves of the bottom flap then being respectively pivoted to housing halves 51, 52. The corrugation forming the separating line 73 preferably projects upwardly into the collecting container, in order to improve the seal on insertion of a partition wall.

Partition walls 71 may be provided away from the circumferential corrugations 60, 61. Thus, it is for example possible to provide a second partition wall size, which is secured at the same spacing to the left or right of the corrugations 60, 61. In this way, in accordance with the different amounts of different material which occur, reception chambers of different sizes are provided, while the outer shape of the collection container suggests container sections each of the same size.

I claim:

1. A collection container for reusable material comprising a closed upper structure which has a bottom portion opening to a base, and to which is pivoted a bottom which can be swung outwardly relative to the base for emptying the collection container the upper structure having at its top at least two insertion openings facing one another and connected to one another by means of a connecting profile which holds respective housing halves together and which extends around the upper structure in a vertical plane, wherein at least two of said insertion openings are provided adjacent one another in a row, and each of the insertion openings is associated with a container section which is defined by a vertical stiffening corrugation, which is located on a container front side between two insertion openings, and which extends into a further, horizontal stiffening corrugation extending in the container top perpendicular to a separating plane between the housing halves for the stabilization of the respective housing halves.

2. A collection container as claimed in claim 1 further comprising a reinforcement profile extending around a lower edge of the upper structure in parallel to the base.

3. A collection container as claimed in claim 2, further comprising hinges for the downwardly pivotable bottom secured to a reinforcement profile.

4. A collection container as claimed in claim 3, further comprising an actuating mechanism which can be gripped from the top for actuating the outwardly swingable bottom, the actuating mechanism being secured to a connecting profile.

5. A collection container as claimed in claim 3, wherein the two housing halves are similarly formed.

6. A collection container as claimed in claim 2, further comprising an actuating mechanism which can be gripped from the top for actuating the outwardly swingable bottom, the actuating mechanism being secured to a connecting profile.

7. A collection container as claimed in claim 2, wherein the two housing halves are similarly formed.

8. A collection container as claim 1, further comprising an actuating mechanism which can be gripped from the top for actuating the outwardly swingable bottom, the actuating mechanism being secured to the connecting profile.

9. A collection container as claimed in claim 1, wherein the two housing halves (51, 52) are similarly formed.

10. A collection as claimed in claim 9, wherein a cover part is arranged over each insertion opening and has an opening aligned with the respective insertion opening, the upper surface of the cover part having an appearance which differs from the surface of a casing surface.

11. A collection container for reusable material, comprising a closed upper structure which has a bottom portion opening to a base, and to which is pivoted a bottom which can be swung outwardly relative to the base for emptying the collection container, the upper structure having at its top at least two insertion openings facing one another and connected to one another by means of a connecting profile which holds respective housing havles together and which extends around the upper structure in a vertical plane, wherein a guide wedge is inserted into an outwardly facing U-shaped groove in the area of an end wall of a connecting profile and has an end which projects from the groove and which is outwardly conically tapered to facilitate alignment and centering of the respective housing halves.

12. A collection container for reusable material, comprising a closed upper structure which has a bottom portion opening to a base, and to which is pivoted a bottom which can be swung outwardly relative to the base for emptying the collection container, the upper structure having at its top at least two insertion openings facing one another and connected to one another by means of a connecting profile which holds respective housing halves together and which extends around the upper structure in a vertical plane, wherein the container has at least one inner partition wall extending perpendicular to the plane of the connecting profile to divide the interior of said container into separate chambers, and wherein the swingable bottom is divided into bottom portions, a separating projection of which is aligned with the respective partition wall to provide an effective seal between the respective partition wall and the bottom.

13. A collection container as claimed in claim 12, wherein the partition wall is secured to stiffening corrugations on the casing and, when the swingable bottom is in a closed state, the partition wall is aligned with a further stiffening corrugation formed in the swingable bottom and facing the interior of the container.

14. A collection container for reusable material, comprising a closed upper structure which has a bottom portion opening to a base, and to which is pivoted a bottom which can be swung downwardly relative to the base for emptying the collection container, the upper structure having at its top at least two insertion openings provided adjacent one another in a row;

wherein each of the insertion openings is associated with a container section which is defined by a vertical stiffening corrugation which is located on a front side of the container between the insertion openings, and wherein the container has at least one partition wall extending perpendicular to said front side of said container, separating at least two chambers of the interior of said container corresponding to said container sections, and being secured to one of said stiffening corrugations for the stabilization of the respective container sections.

15. A collection container as claimed in claim 14, wherein the swingable bottom is divided into bottom portions, a separation gap of each of which is aligned with the respective partition wall.

16. A collection container as claimed in claim 14, wherein the partition wall fills the entire cross section of the container perpendicular to said front side.

17. A collection container as claimed in claim 14, wherein the upper structure consists of two housing halves facing one another and connected to one another by means of a connecting profile which holds the housing halves together and which extends around the upper structure in a vertical plane.

18. A collection container as claimed in claim 17, wherein the two housing halves are similarly formed.

19. A collection container as claimed in claim 14, further comprising a reinforcement profile extending around a lower edge of said upper structure parallel to the base.

20. A collection container as claimed in claim 14, further comprising hinges for the downwardly swingable bottom secured to a reinforcement profile.

21. A collection container as claimed in claim 14, further comprising an actuating mechanism which can be gripped from the top for actuating the downwardly swingable bottom.

22. A collection container as in claim 21, wherein said actuating mechanism comprises a first ring connected to the downwardly swingable bottom and a second ring fixedly attached to said upper structure.

23. A collection container as claimed in claim 14, further comprising a cover part arranged over each insertion opening and having an opening aligned with the respective insertion opening, an upper surface of the cover part having an appearance which differs from the surface of a casing surface.

* * * * *